United States Patent
Olk

(10) Patent No.: US 10,908,057 B2
(45) Date of Patent: Feb. 2, 2021

(54) ACTIVATING A SUBMERSIBLE SENSOR BASED ON ELECTRODE OUTPUT, AND RELATED SYSTEMS, METHODS AND DEVICES

(71) Applicant: Microchip Technology Incorporated, Chandler, AZ (US)

(72) Inventor: Phillip Sebastian Olk, Trøndelag (NO)

(73) Assignee: Microchip Technology Incorporated, Chandler, AZ (US)

( * ) Notice: Subject to any disclaimer, the term of this patent is extended or adjusted under 35 U.S.C. 154(b) by 100 days.

(21) Appl. No.: 16/224,499

(22) Filed: Dec. 18, 2018

(65) Prior Publication Data

US 2020/0072720 A1 Mar. 5, 2020

Related U.S. Application Data

(60) Provisional application No. 62/726,789, filed on Sep. 4, 2018.

(51) Int. Cl.
*G01N 9/10* (2006.01)

(52) U.S. Cl.
CPC ..................... *G01N 9/10* (2013.01)

(58) Field of Classification Search
CPC .................. G01N 9/14; G01N 9/10
See application file for complete search history.

(56) References Cited

U.S. PATENT DOCUMENTS

| | | |
|---|---|---|
| 3,602,661 A | 8/1971 | Liedberg |
| 4,466,285 A | 8/1984 | Allemano |
| 5,847,473 A | 12/1998 | Anfosso et al. |
| 6,603,319 B1 | 8/2003 | Kasahara et al. |
| 7,963,164 B2 | 6/2011 | Ross, Jr. et al. |
| 8,937,611 B2 | 1/2015 | Yilmaz et al. |

(Continued)

FOREIGN PATENT DOCUMENTS

| | | |
|---|---|---|
| CN | 102230816 A | 11/2011 |
| CN | 107228699 A | 10/2017 |

(Continued)

OTHER PUBLICATIONS

AT12705: SAM L21 ADC Sampling using Low-Power Features [Application Note], Smart Arm-based Microcontrollers, ATMEL Corporation, 2015, 12 pages.

(Continued)

*Primary Examiner* — Paul M. West
*Assistant Examiner* — Mark A Shabman
(74) *Attorney, Agent, or Firm* — TraskBritt

(57) ABSTRACT

A submersible sensor comprising a fluid-tight shell, electrodes operatively coupled to the inner surface of the fluid-tight shell, and a processor disposed within the fluid-tight shell and operatively coupled to the electrodes. The processor is configured to detect capacitance changes at the electrodes, detect a first property of a first medium responsive to first detected capacitance changes of the detected capacitive changes, detect a second property of a second medium responsive to second detected capacitance changes of the detected capacitive changes, and activate one or more operational modes responsive to a difference between the first property and the second property.

20 Claims, 5 Drawing Sheets

(56) References Cited

U.S. PATENT DOCUMENTS

| | | |
|---|---|---|
| 9,800,713 B2 | 10/2017 | Dempster et al. |
| 2005/0172712 A1 | 8/2005 | Nyce |
| 2005/0179445 A1* | 8/2005 | Nakano .................. E05F 15/46 |
| | | 324/661 |
| 2017/0021068 A1* | 1/2017 | Gaskin .................. A61M 1/06 |

FOREIGN PATENT DOCUMENTS

| | | |
|---|---|---|
| WO | 96/28834 A1 | 9/1996 |
| WO | 2016/164853 A1 | 10/2016 |

OTHER PUBLICATIONS

International Search Report for International Application No. PCT/US2019/046539, dated Nov. 25, 2019, 4 pages.
International Written Opinion for International Application No. PCT/US2019/046539, dated Nov. 25, 2019, 8 pages.

* cited by examiner (State Of The Art)

ACTIVATING A SUBMERSIBLE SENSOR BASED ON ELECTRODE OUTPUT, AND RELATED SYSTEMS, METHODS AND DEVICES

CROSS-REFERENCE TO RELATED APPLICATION

This application claims the benefit under 35 U.S.C. § 119(e) of U.S. Provisional Patent Application Ser. No. 62/726,789, filed Sep. 4, 2018, the entire contents and disclosure of which is hereby incorporated herein by this reference.

FIELD

The present disclosure relates, generally, to submersible sensors, and more specifically, submersible sensors that are able to be automatically activated.

BACKGROUND

Submersible sensors may be deployed in a variety of settings to analyze a fluid. Existing submersible sensors may have additional parts such as mechanical switches (e.g., toggle, depressible button, or slide switch) and access ports that add to the size, cost, rate of failure of a sensor device, and opportunity for user-error. In one example, a mechanical switch may inadvertently be left in the off position by the user prior to deployment. For certain miniature sizes, there may be a trade-off between having a mechanical switch of sufficient size that a user may manipulate it, and difficulty with maintaining the integrity of the walls of the submersible sensor. Additionally, some sensors are tethered to a fixed location such as by a power cord to a power source. As a result, the submersible sensor is not able to freely flow with a fluid current.

In some conventional sensors, the sensor includes a body to protect internal components from fluids. Such conventional sensors may have apertures or ports for various components (e.g., power cord, data transmission line, and/or mechanical switch) to protrude from. Fluid may penetrate the apertures/ports and ruin the internal components of the sensor.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
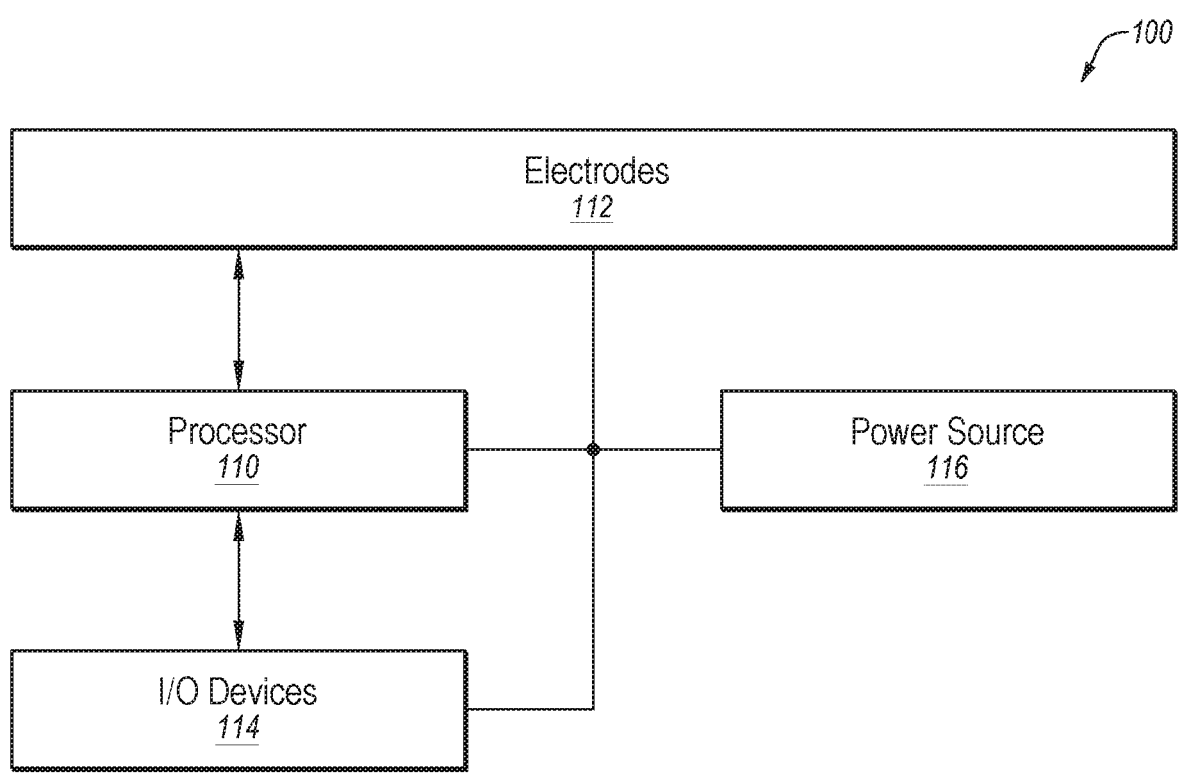
FIG. 1 is a schematic block diagram of an electrical system for a sensing capsule according to an embodiment of the disclosure.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

The present description may include examples to help enable one of ordinary skill in the art to practice the disclosed embodiments. The use of the terms "exemplary," "by example," "by way of example," "for example," "e.g.," and similar wording means that the related description is explanatory, and though the scope of the disclosure is intended to encompass the examples and legal equivalents, the use of such terms is not intended to limit the scope of an embodiment or this disclosure to the specified components, steps, features, functions, or the like.

In accordance with common practice, the various features illustrated in the drawings may not be drawn to scale. The illustrations presented herein are not meant to be actual views of any particular apparatus (e.g., device, system, etc.) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that a person of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Embodiments of the disclosure include a submersible sensor configured for self-activation responsive to a submersible sensor transitioning from a first medium to a second medium (e.g., immersion in a fluid, being removed from a fluid, or moving from one type of fluid to a different type of fluid). A submersible sensor may include an integrated shell housing (e.g., enclosure or hull), an electronic system with a power source, processor, I/O devices (e.g., communication elements or on-board data recording devices) and touch sensors (e.g., capacitive sensors) configured to generate an output indicative of an external medium (e.g., air, water, oil). Such embodiments may, for example, eliminate a need for a mechanical switch and/or connection to an external power source for activation or deactivation. For example, the detection of change from a first medium (e.g., air) to a second medium (e.g., water) automatically activates a submersible sensor.

In some conventional systems, providing for manual manipulation or remote activation for switching is often impractical in terms of cost. As a result, embodiments of the disclosure may provide for a smaller submersible sensor size, lower cost per unit, single-use applications, reusable applications, and be structurally more robust with no moving parts in comparison with conventional sensors. Embodiments may be configured for a submersible sensor to, one or more of, (1) automatically activate an on/off state, (2) automatically activate a standby or low-power mode, and (3) automatically activate a sensing mode. Submersible sensors according to embodiments of the disclosure may have a relatively long shelf life pre-deployment as well as a long usable life after the initial use as compared to conventional sensors that use mechanical switches (or various ports/apertures) to enable/disable the device or have access ports for an external power source.

Figure 6:
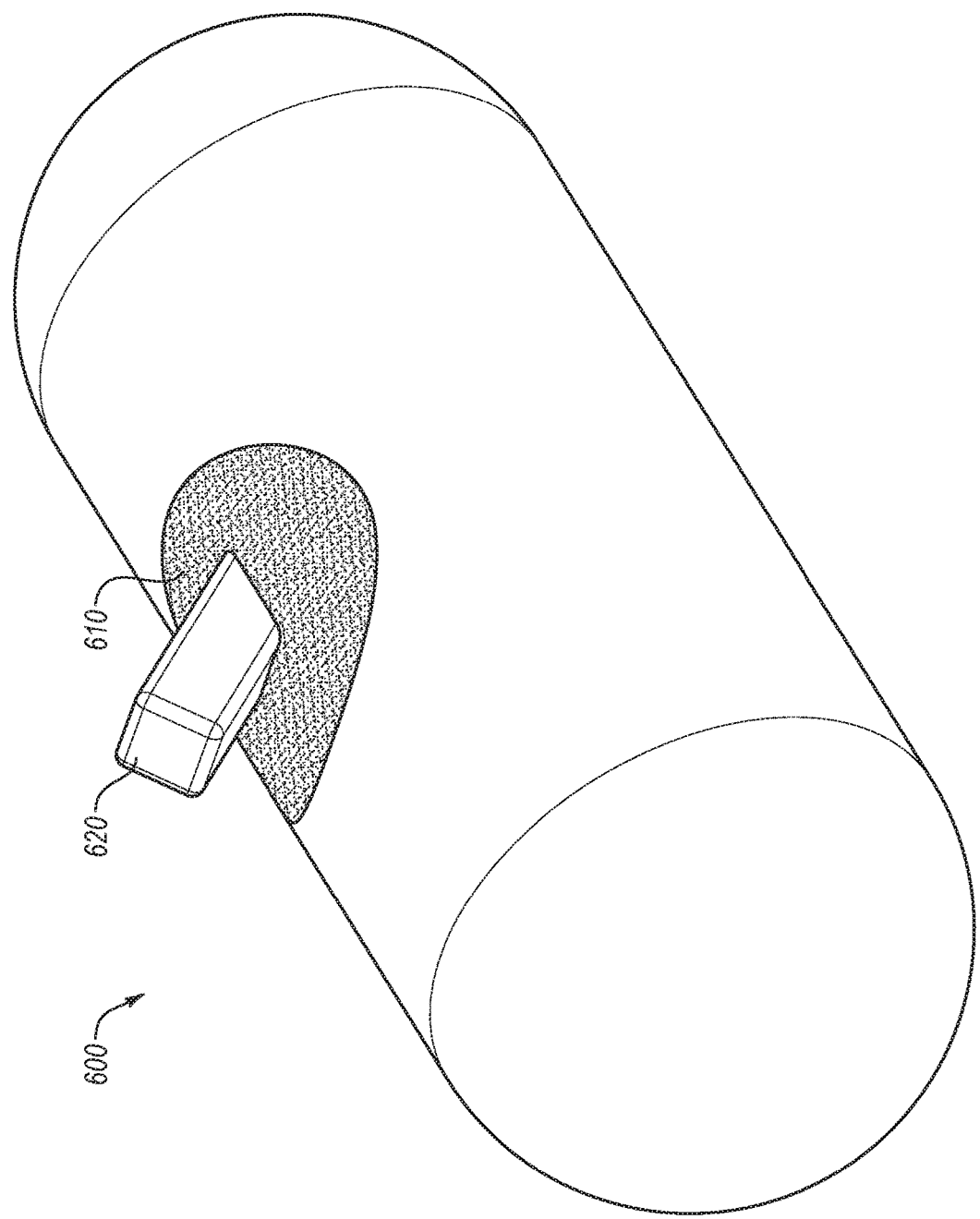
FIG. 6 is a schematic of a conventional sensing capsule including a mechanical switch.

FIG. 6 depicts an example conventional sensor 600. As described above, a conventional sensor may have apertures or ports for various components (e.g., power cord, data transmission line, mechanical switch, etc.) to protrude from. The sealing functionality of the ports may break down over time. As a result, fluid may penetrate the apertures/ports and ruin the internal electrical components of the sensor. For example, referring to FIG. 6, sensor 600 includes mechanical switch 620 (e.g., toggle switch) protruding from port 610. The sealing of fluids from entering into the sensor 600 at port 610 around mechanical switch 620 may be difficult to design. Additionally, the cost of materials and design may be quite high. Moreover, the fluid sealing of port 610 around mechanical switch 620 may fail over time. For example, mechanical switch 620 may be toggled back and forth hundreds or thousands of times over the life-span of sensor 600. The repeated physical movement of the toggle switch also physically affects the material used for fluid sealing of the switch at port 610. As a result, the fluid sealing capability of port 610 may fail over time. Additionally, the media surrounding sensor 600 may degrade the fluid sealing capability of port 610 and also cause the fluid sealing capability to fail.

As used herein, the term "submersible sensor" is intended to encompass submersible sensors and immersible sensors as both terms are used in the art. Moreover, in this disclosure "sensor" and "submersible sensor" are used interchangeably to refer to a submersible sensor. In various embodiments, a shell of a sensor may be fluid-tight. That is, a shell of a sensor is a unitary component that does not allow fluid to penetrate. More specifically or in other words, a shell in various embodiments, may be a continuous integral shell that does not include any apertures or ports (e.g., a through-hole through a wall of a shell). Additionally, a sensor, in various embodiments, may not include any internal component (e.g., antenna, I/O device, cable) that extends from inside of the shell to the outside of the shell wall. In other words, one or more (or each of) internal components of a sensor (e.g., antenna, I/O device, cable) do not extend from inside of the shell to the outside of the shell wall.

In one or more embodiments, a choice of materials for a shell (also referred to herein as an outer shell) may be selected to allow for wide chemical compatibility. For example, materials for an outer shell of a sensor capsule may be specifically tailored for applications in a variety of different industries, including health care, chemical engineering and biotechnology, energy and oil, water analysis (e.g., drinking water, pool water, oceanic research or other bodies of water), automotive, entertainment, internet of things (IoT), home applications, plants, food, and more.

As will be described in further detail below, various embodiments herein include a submersible sensor. One embodiment of a submersible sensor includes: (1) a fluid-tight shell having an outer surface, and an inner surface opposite the outer surface, (2) electrodes operatively coupled to an inner surface of a fluid-tight shell, and (3) a processor disposed within a fluid-tight shell and operatively coupled to the electrodes. The processor is configured to detect capacitance changes of electrodes, detect a first property of a first medium responsive to first detected capacitance changes of detected capacitive changes, detect a second property of a second medium responsive to second detected capacitance changes of detected capacitive changes, and activate one or more operational modes responsive to a difference between a first property (of a first medium) and a second property (of a second medium).

FIG. 1 is a schematic block diagram of electrical system 100 for a submersible sensor according to an embodiment of the disclosure. Electrical system 100 includes processor 110 operably coupled with one or more electrodes 112 (e.g., capacitive touch sensor, resistive touch sensor, inductive touch sensors) and I/O devices 114. Electrical system 100 may further include power source 116 configured to provide power to processor 110, electrodes 112, and/or I/O devices 114. As will be described in further detail below, submersible sensor 200, depicted in FIG. 2, includes electrical system 100.

Processor 110 may be configured for controlling I/O devices 114 to perform a specific application that may be activated and/or deactivated responsive to output of electrodes 112. For example, processor 110 determines that an output of electrodes 112 is indicative of a submersible sensor comprising electrical system 100 in a first medium (e.g., water). Accordingly, processor 110 controls one or more I/O devices 114 to perform a specific function(s) indicative of the submersible sensor in the first medium. Similarly, for example, processor 110 determines that the output of electrodes 112 is indicative of the submersible sensor transitioning from the first medium (e.g., water) to the second medium (e.g., oil). It is to be understood that processor 110 may not detect the actual transition, but may instead at a different time determine that the output of electrodes 112 is indicative of the submersible sensor in the second medium, without exceeding the scope. Accordingly, processor 110 controls one or more I/O devices 114 to perform a specific function(s) indicative of the sensor transitioning into the second medium (from the first medium), or indicative of the sensor in the second medium.

Examples of contemplated operations of processor 110 are non-limiting and may also be performed by any type of processor operating in conjunction with a memory, including a microprocessor, digital-signal-processor (DSP), combinational logic and memory implementing a state machine, or field-programmable gate array (FPGA), or performed in a computer, embedded system, or other similar system or device.

Electrodes 112 may be disposed on inner surface 203 of a shell (FIG. 2) that houses electrical system 100. In various embodiments, the electrodes may be disposed on an outer surface of a shell or disposed under plurality of thin layers (µm) of material (e.g., plastic). These arrangements are a matter of design choice and the disclosure is not limited to the example. In one embodiment, electrodes 112 may be capacitive sensors configured to detect a change in capacitance responsive to an external force applied to a shell. Electrodes 112 may be any type of electrode (e.g., capacitive touch sensor, resistive touch sensor, inductive touch sensor and the like) that is able to output a signal indicative of a type of medium (e.g., air, water, oil, biomass) at the outer surface of the shell of the sensor (e.g., outer surface 204 of shell 202 of submersible sensor 200 in FIG. 2). For example, an electrode of one or more embodiments may provide an output signal indicative of a type of media at the outer surface of the sensor based, at least in part on, various properties of the medium (e.g., fluid density, dielectric constant). In various embodiments, the electrodes 112 are contact sensing sensors that use various techniques to "sense" the media, for example, self-capacitances, mutual capacitances, and a combination thereof.

I/O devices 114 may include functional modules configured to perform various operations. In some embodiments, I/O devices 114 may include input devices and/or output devices. Examples of input devices may include accelerometers, image sensors, chemical sensors, nuclear sensors (e.g., gamma sensors, neutron sensors), pH sensors, wireless receivers, microphones, on-board recording devices, and/or temperature sensor. Examples of output devices may include emitters such as wireless transmitters, audio devices (e.g., speakers). I/O devices 114 may be selected for a particular application and analysis to be performed by submersible sensor 200.

Power source 116 may include any type of power source such as a battery (e.g., lithium ion), an energy cell, and/or an energy harvester (e.g., microelectronic and microelectro mechanical systems (MEMS) for conversion of vibration to energy). For certain applications, battery life may sustain an electrical system 100 in low-power mode on the order of several months to several years depending on the combination of battery size and sampling frequency for the low power mode without being activated to a higher sampling frequency of the high power modes.

In a contemplated operation, an output (e.g., current or voltage) of electrodes 112 may respond to changes in a property of a medium contacting an outer surface of a shell (e.g., change from a first density of a first medium to a second density of a second medium, or change from a first dielectric constant of a first medium to a second dielectric constant of a second medium). For example, a transition of a first dielectric constant of a first media to a second dielectric constant of a second media at an outer surface of a shell generates a (stray) capacitance change occurring within electrodes 112. In other words, electrodes 112 respond to a change in a property of a medium contacting a shell. For example, electrodes 112 generate a first output (e.g., a first capacitance corresponding to a first medium) when the sensor is in a first medium, and generate a second output (e.g., a second capacitance corresponding to a second medium) when the sensor is in a second medium. It should be appreciated that the term dielectric constant can also be referred to as permittivity (or relative permittivity).

In this disclosure "contact" means physical contact or within proximity to an outer surface of a shell to cause a detectable change at the electrodes 112—e.g., to affect fringing fields at electrodes 112. In some embodiments, not every change may be an activating event for a submersible sensor. Processor 110 may determine if an event is an activating event (e.g., immersion into the desired material, transition from a first fluid to a second fluid) or a non-activating event (e.g., touch by a user, transition from a first fluid to an un-desired second fluid).

In some embodiments a form of capacitive sensing may be self-capacitive sensing. Self-capacitance sensors are capacitive field sensors that detect/respond to changes in capacitance to ground. An example of a self-capacitive sensor includes a circuit employing repetitive charge-then-transfer cycles using common integrated CMOS push-pull driver circuitry having floating terminals. In other embodiments, the self-capacitive sensing may be in addition to mutual capacitive sensing, for example, to confirm a mutual capacitive measurement indicating a touch event. Mutual capacitance sensors are capacitive field sensors that detect changes in capacitance between two electrodes: a drive electrode and a sense electrode Activating events may cause different functions of submersible sensor 200 to be activated by processor 110 such as one or more different operational modes. For example, a first operational mode of submersible sensor 200 may be a lower power mode (e.g., a "sleep" mode or "stand-by" mode) in which processor 110 may be configured to periodically wake up to sample an output of electrodes 112 to determine if an activating event has occurred. If processor 110 determines that a submersible sensor has transitioned from a first medium to a second medium, a second operational mode of a submersible sensor may be activated that may be a higher power mode during which a submersible sensor may perform one or more specific operations associated with the second operational mode. In some embodiments, submersible sensor 200 transitioning back from the second medium to the first medium may result in processor 110 re-entering the low power mode.

In some embodiments, additional operational modes are also contemplated. For example, processor 110 may be configured to perform a first set of operations when submersible sensor 200 is within the first medium, a second set of operations when submersible sensor 200 is within the second medium, and a third set of operations when submersible sensor 200 is within a third medium. Additional operating modes for additional mediums are equally applicable. In addition, particular operations may be dependent upon a particular transition. For example, if processor 110 detects a transition from the first medium (e.g., fresh water) to the second medium (e.g., salt water), a different set of operations may be activated than if processor 110 detects a transition from the third medium (e.g., oil) to the second medium (e.g., salt water). Thus, even though a submersible sensor may be located within the same second medium (e.g., salt water) in both scenarios, specific operations may be different because of the preceding medium before the transition. Some non-limiting transitions may include air to water (and vice versa), fresh water to salt water (and vice versa), air to blood (and vice versa), water to oil (and vice versa), a first bodily fluid and a second bodily fluid, a first biomass to a second biomass, a first chemical to a second chemical (including embodiments in which a chemical process involving the first chemical results in the second chemical), and so on. In one use case example, processor 110 detects a humidity in brake fluid. In such an example, a processor detects a transition of the brake fluid having a first humidity percentage to the brake fluid having a second humidity percentage (e.g., increase of a few percent humidity).

In these examples, the first medium may exhibit a first fluid density (or dielectric constant) and the second medium may exhibit a second fluid density (or dielectric constant) that is different from the first fluid density. Difference in fluid densities (or dielectric constants) may impose measurable differences in capacitance at electrodes 112, which are detectable by processor 110. In a more specific example, a specific fluid density of the first medium will have a corresponding detectable first capacitance. As such, electrodes 112 may detect a first property (e.g., the first density of a first fluid in which submersible sensor 200 is immersed) and a second property (e.g., the density of the second fluid in which submersible sensor 200 is immersed) based on a change in capacitance (or a change in resistance or inductance as is known in the art). Processor 110 may read electronically readable instructions on an associated memory causing processor 110 to, upon detection of a change from the first property of the first medium (e.g., fluid density of fresh water) to the second property of the second medium (e.g., fluid density of salt water), change from the low power mode to one of the higher power modes. The electronically readable instructions may further cause processor 110 to detect changes of medium, for example, moving from salt water to fresh water and send an alert via I/O devices 114 responsive to the detected change of medium.

Figure 2:
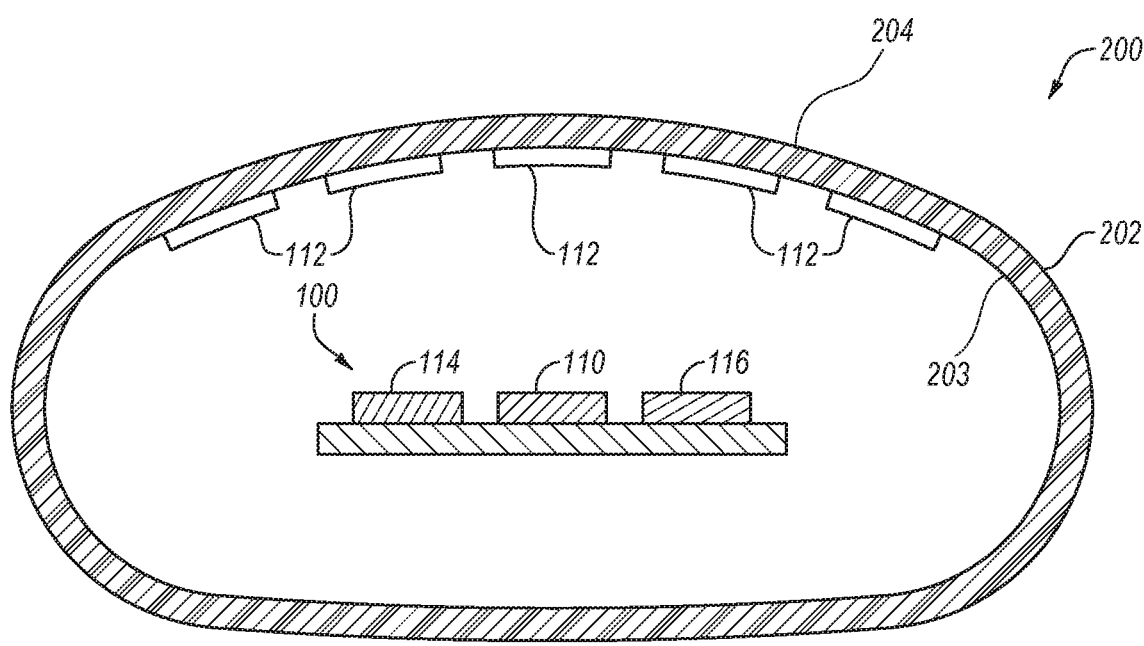
FIG. 2 is a schematic of a sensing capsule according to an embodiment of the disclosure.

In various embodiments, the relative permittivity of a submersible device may change with respect to the medium in contact with the submersible device. For example, the submersible device has a first relative permittivity when in contact with a first medium (e.g., salt water) and a second relative permittivity when in contact with a second medium (e.g., fresh water). Accordingly, electrodes 112 may detect may detect a first relative permittivity of submersible sensor 200 immersed in a first fluid and second relative permittivity of the sensor immersed in a second fluid based on a change in capacitance of the electrodes. FIG. 2 is a schematic of submersible sensor 200 (e.g., a sensing capsule) according to an embodiment of the disclosure. Submersible sensor 200 includes shell 202 that encapsulates electrical system 100 of FIG. 1. Thus, submersible sensor 200 may be an encapsulated device that includes internal power source 116, processor 110, electrodes 112, and one or more functional units including I/O devices 114, (e.g., sensors, emitters). In various embodiments, processor 110 and/or I/O devices 114 are configured to record, report, and/or control application specific functions that may be activated responsive to detecting a transition of submersible sensor 200 between different media (e.g., immersion in a liquid). Some operating modes include a low power mode (i.e. an energy saving state) and one or more different higher power modes, i.e. operational states.

Although shell 202 is shown in FIG. 2 as being generally oval-shaped, additional shapes (e.g., spherical, cylindrical, rectangular, or any other shape) are contemplated and may be selected for the specific deployment scenario. Shell 202 may be formed from a non-conductive material that also protects electrical system 100 from the medium in which submersible sensor 200 is intended for deployment (e.g., using a waterproof material). For example, in some embodiments, shell 202 may be formed from a plastic material, a polymer, a wax, an epoxy, or glass, compatible with the particular deployment scenario. In various embodiments, electrical system 100 may wirelessly communicate with external devices via I/O devices 114 and a thickness of shell 202 may be selected to be sufficiently thin to enable transmission of wireless signals while still sufficiently protecting electrical system 100. Shell 202 is preferably a fluid-tight shell.

Figure 3:
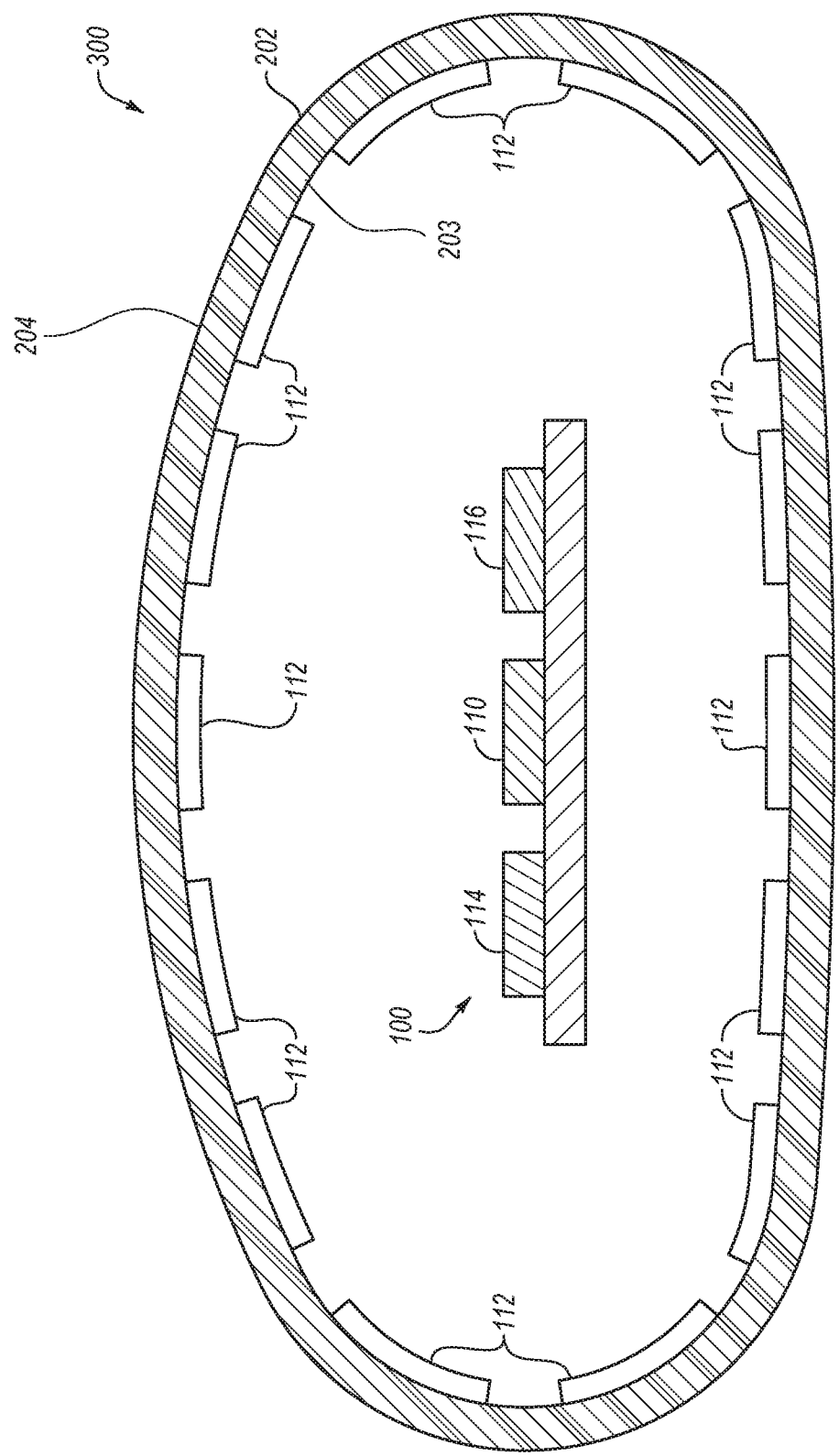
FIG. 3 is a schematic of a sensing capsule according to an embodiment of the disclosure.

As shown in FIG. 2, and in relation to a submersible sensor 300 of FIG. 3, shell 202 does not include any ports or apertures. In particular, each of the components of electrical system 100 are disposed within shell 202. As such, shell 202 preferably does not include any openings (e.g., ports or apertures). For example, preferably none of the components of electrical system 100 protrude through shell 202 such that they protrude from outer surface 204 of shell 202. It is noted that outer surface 204 of shell 202 (e.g., oval) is substantially uniform. For example, outer surface 204, in various embodiments, is substantially smooth and does not include any protrusions (or openings). Moreover, shell 202 is a continuously integral shell because shell 202 does not have any openings (as described above). Accordingly, shell 202 (that is substantially smooth) is less susceptible to failure and prolongs the use of submersible sensor 200 by not allowing fluid to penetrate within shell 202.

Electrodes 112 may be arranged spatially around shell 202. In some embodiments, electrodes 112 may be arranged at least a portion of an inner surface 203 of shell 202, such as a first portion of inner surface 203 (as depicted in FIG. 2). In other words, in an embodiment, electrodes 112 are tightly grouped (or dispersed) along a portion (e.g., first portion) of inner surface 203. In another embodiment, at least a subset of the electrodes are overlapping one another. In a further embodiment, submersible sensor 300 includes at least two electrodes. These arrangements are a matter of design choice and the disclosure is not limited to the examples. The arrangement of electrodes may be on more than one portion of shell 202, such as a second portion of inner surface 203 opposite the first portion of inner surface 203 (as depicted in FIG. 3 in relation to submersible sensor 300). In other words, in an embodiment, electrodes 112 are dispersed along inner surface 203 (e.g., dispersed along a first portion and second portion of inner surface 203). The arrangement of electrodes may be opposing pairs, or other patterns as desired for the deployment scenario. The arrangement of electrodes may be evenly spaced apart along at least a portion of, or along the entirety of, inner surface 203 of shell 202. The arrangement of electrodes 112 may be spaced unevenly with respect to one another along at least a portion of, or along an entirety of, inner surface 203 of shell 202.

Responsive to immersion into (or emersion from) suitable liquids, electrodes 112 may detect the media change by measuring properties (e.g., fluid density, dielectric constant). Processor 110 inside shell 202 may, in a low power mode, regularly sample electrodes 112, and upon detection of a predetermined condition of electrodes 112 change to a higher power mode and initiate application-specific operations (e.g., data logging or data transmission). In other words, in one embodiment a submersible sensor 200, 300 may enter into a predetermined operational state based, at least in part, for example, on a predetermined capacitance or a change in capacitance of electrodes 112.

Submersible sensor 200, 300 thus does not require a mechanical switch, an aperture or a port to accommodate a switch configuration. Advantageously, power source 116 may be simplified and/or reduced in size as compared to the prior art. As a result, miniature submersible sensors are enabled, which may provide opportunities for creating application-specific sensors in a variety of different technical areas. Thus, embodiments of the disclosure may enable different probing methods, provide an application for internet of things (IoT), process analysis, incorporated into tubing, biological organisms, provide fluid analysis in chemical or physical production processes, or for medical diagnosis purposes, or for other systems. For any of these purposes, for example, it may be desirable to have a small package size, and submersible sensor 200, 300 may blend in and flow with the fluid, and record data during the journey.

In some embodiments, submersible sensor 200, 300 may operate as a level switch for a tank, well, appliance, or other equipment or locations in which measuring a fluid level or other fluid analysis may be desired as well known in the art. For example, one or more submersible sensors are attached at predetermined levels of a tank. In such an example, the one or more submersible sensors detect medium at a predetermined level. As such, a level of the medium in the tank can be determined. In various embodiments, submersible sensor 200, 300 may be located within a home appliance such as a dish washer, washing machine, water heater, at a location that, if activated by water, is indicative of a problem (e.g., flooding). In such an embodiment, submersible sensor 200, 300 may enter into an operational mode in which the submersible sensor 200, 300 transmits a command to an external device that may take certain actions to turn off the appliance. In another embodiment, submersible sensor 200, 300 may transmit a message to a user (e.g., via text message, email message, phone call or push notification) over a network connection (e.g., cellular networks, WiFi, Bluetooth, ZigBee) via I/O device 114 informing the user of the detected problem. A user may be, for example, a person, a home appliance monitoring system, a home security system, a building utility monitoring system, a building management system, a plant management system, a process management system, test equipment, and more. So, in one or more embodiments, submersible sensor 200, 300 may be configured to communicate via I/O devices 114 with a home or building management system or other management system to control various processes and/or transmit messages when issues are detected. Similar embodiments may be employed within plant systems to determine moisture of the ground or other plant features, such as detecting a transition from a medium that is well hydrated to being not hydrated (e.g., of a biomass) over time after a predetermined threshold is crossed. Detecting such an issue may trigger an alert and/or initiate a process for remedying the issue.

In some embodiments, a plurality of submersible sensors may be employed to perform analysis in combination with each other. For example, multiple submersible sensors may be disposed at different locations of a stationary object or deployed in a moving medium. For example, many submersible sensors may be released into a liquid (e.g., a body of water) and combined measurements may provide a larger system with more useful data than if only one submersible sensor were used. In some embodiments, shells and/or other features of submersible sensors may be modified. For example, the buoyancy of different submersible sensors may be varied so that they may be suspended at different depths to capture different types of measurements.

Figure 4:
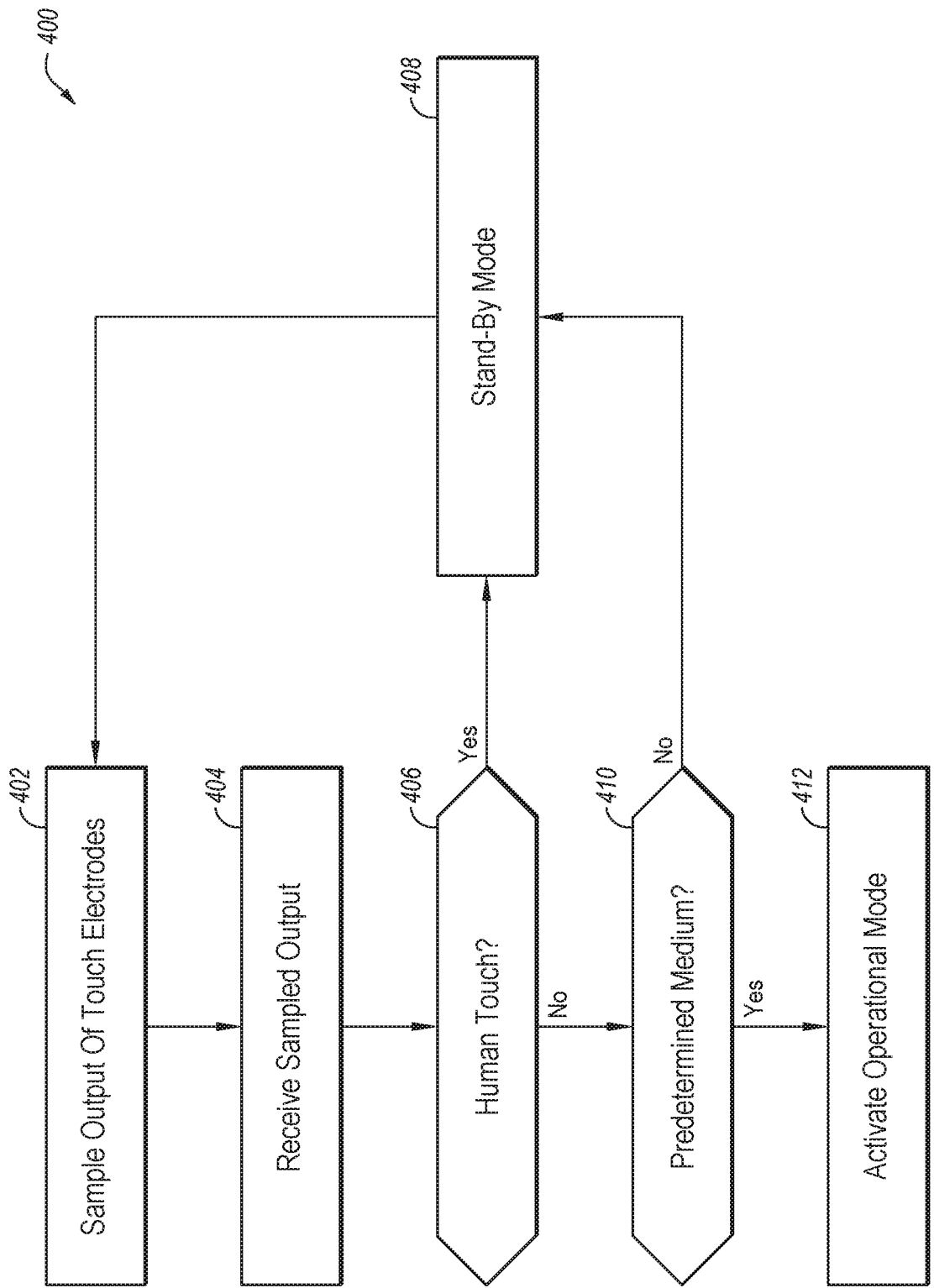
FIG. 4 is a flowchart illustrating a method for operating a sensing capsule according to an embodiment of the disclosure.

FIG. 4 is a flowchart illustrating a method 400 for operating a submersible sensor according to an embodiment of the disclosure. At operation 402, an output of electrodes may be sampled according to a sampling rate (also referred to herein as sampling frequency). A sampling rate may be based, in part, on which operational mode a submersible sensor is currently operating in. For example, in low power mode (which may also be commonly referred to in the art as a stand-by mode, or a sleep mode), a sampling rate may be reduced responsive to being in low power mode. A reduced sampling rate reduces power consumption and so extends operation of a power source as compared to using a higher sampling rate. In a different operational mode in which different operations are performed (e.g., sensing and transmitting information about properties of mediums), a sampling rate may be increased as compared to a sampling rate while in the low power mode.

At operation 404, a sampled output may be received by a processor, and the processor may determine if the output is indicative of human touch at operation 406. If so, the human touch may be ignored for purposes of activating a change in operational mode, and a submersible sensor may remain in low power mode at operation 408. A human touch may be detected based on output values from different electrodes. In addition, with knowledge of a spatial arrangement of different electrodes, the processor may be configured to distinguish between human touch, in which a substantial change in the output of the sensors may occur in only some of the locations that might indicate touch by the user.

At operation 410, the sampled output may be analyzed to determine if the output response of the electrodes is indicative of a predetermined medium associated with an operational mode supported by the processor. If not, then the sensing capsule may continue to remain in low power mode at operation 408 and periodically sample the touch electrodes at a lower frequency. If so, then the sensing capsule may wake up and enter into the appropriate operational mode determined by the processor at operation 412. As discussed above, the operational mode may be based, at least in part, on a particular medium in which the sensing capsule has entered into. In some embodiments, the operational mode may be based, at least in part, on a particular transition between two different mediums. For example, an operational mode is activated based, at least in part, on the submersible sensor transitioning from a first predetermined medium to a second predetermined medium. The particular medium may be determined responsive to the output of the electrodes. For example, the different possible outputs of the electrodes may be pre-stored and/or updated in a lookup table each associated with a particular operational mode. In some embodiments, the operational mode may also be based on other data from the input devices combined with the electrodes.

Figure 5:
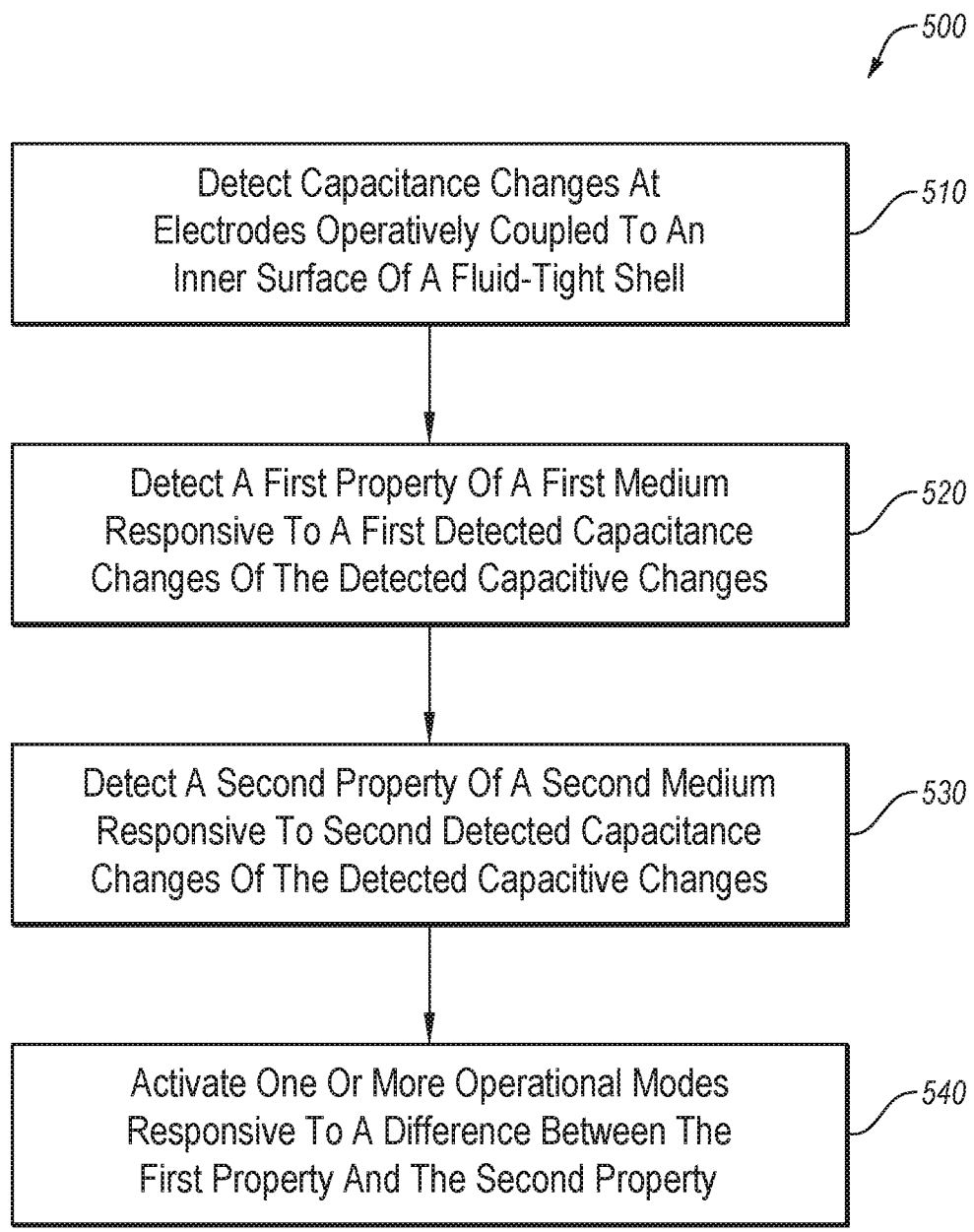
FIG. 5 is a flowchart illustrating a method for operating a sensing capsule according to an embodiment of the disclosure.

FIG. 5 is a flowchart illustrating a method 500 for operating a sensing capsule according to an embodiment of the disclosure. At operation 510 of method 500, capacitance changes are detected at the electrodes operatively coupled to the inner surface of a fluid-tight shell. For example, processor 110 (e.g., a microprocessor) regularly receives the output of the electrodes, or polls the electrodes to detect the capacitance thereof, and detects that there is a capacitance change of the electrodes based on a difference between a first capacitance and a subsequent second capacitance. For example, processor 110 detects a fluid density of a first medium (e.g., water) based on the output signals of the electrodes received by the processor and subsequently detects a fluid density of a second medium (e.g., salt water). In such an example, the capacitance changes of the electrodes measured by the processor are indicative of the submersible sensor transitioning from a first medium to a second medium.

At operation 520, a first property of a first medium is detected responsive to a first detected capacitance changes of the detected capacitive changes. For example, the processor detects a fluid density of a first medium (e.g., water) based on the output signals of the electrodes received by the processor. In such an example, the capacitance of the electrodes measured by the processor is indicative of the first medium (e.g., water).

At operation 530, a second property of a second medium is detected responsive to a second detected capacitance changes of the detected capacitive changes. For example, the processor detects a fluid density of a second medium (e.g., oil) based on the output signals of the electrodes received by the processor. In such an example, the capacitance of the electrodes measured by the processor is indicative of the second medium (e.g., oil). It is noted that the capacitance of the electrodes associated with the first medium is different than the capacitance of the electrodes associated with the second medium.

At operation 540, the processor activates one or more operational modes responsive to a difference between the first property and the second property. For example, the processor activates an operational mode based on the transition of the sensor from the first medium (e.g., water) to the second medium (e.g., oil). More specifically, based on the difference of measured capacitances (based on the transition from the first medium to the second medium) the processor activates an operational mode associated with the sensor transitioning from the first medium to the second medium.

In various embodiments, one or more operational modes of method 500 may be sensing modes. For example, responsive to a difference between the first property and the second property a sensing mode is activated. In such a sensing mode, a submersible sensor may gather sensor data, process/analyze data and/or transmit data. For example, responsive to detecting a first medium, a first sensing mode is activated (e.g., gather sensor data) and response to detecting a second medium, a second sensing mode is activated (e.g., transmit data).

In various embodiments, an electrode, as described herein is manufactured as follows: (1) coat a PCB with resin, (2) clean up/grind down resin to expose the electronic contact pads, (3) evaporate electrodes onto resin and pads, and (4) dip-coat device with paint/plastic for protective or spacing layer. In some instances, steps 2 through 4 are repeated for more complex structures. These steps are a matter of manufacturing design choice and the disclosure is not limited to the examples.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventors.

Many of the functional units described in this specification may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are Flash memory and random-access-memory (RAM). Another example of a non-transitory storage device includes a read-only memory (ROM) which may store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with legal equivalents thereof. In addition, features from one embodiment may be combined with features of another embodiment while still being encompassed within the scope of the invention.

Additional non-limiting embodiments of the disclosure include:

Embodiment 1: a submersible sensor comprising: a fluid-tight shell comprising: an outer surface; and an inner surface opposite the outer surface; electrodes operatively coupled to the inner surface of the fluid-tight shell; and a processor disposed within the fluid-tight shell and operatively coupled to the electrodes, the processor configured to: detect capacitance changes at the electrodes; detect a first property of a first medium responsive to first detected capacitance changes of the detected capacitive changes; detect a second property of a second medium responsive to second detected capacitance changes of the detected capacitive changes; and activate one or more operational modes responsive to a difference between the first property and the second property.

Embodiment 2: the submersible sensor of Embodiment 1, wherein the first property is a fluid density of the first medium and the second property is a fluid density of the second medium.

Embodiment 3: the submersible sensor of Embodiment 1, wherein the electrodes includes capacitive electrodes.

Embodiment 4: the submersible sensor of Embodiment 1, wherein the one or more operational modes includes a power on mode, power off mode, a low power mode, and a sensing mode.

Embodiment 5: the submersible sensor of Embodiment 1, wherein the one or more operational modes includes a first sensing mode and a second sensing mode different than the first sensing mode.

Embodiment 6: the submersible sensor of Embodiment 1, wherein a first operational mode is operable at a first sensing frequency and a second operational mode is operable at a second sensing frequency.

Embodiment 7: the submersible sensor of Embodiment 1, wherein the processor is selected from a group consisting of: a microcontroller and a microprocessor.

Embodiment 8: the submersible sensor of Embodiment 1, wherein the fluid-tight shell does not include a port extending from the outer surface to the inner surface.

Embodiment 9: the submersible sensor of Embodiment 1, wherein the fluid-tight shell does not include a component physically extending from the inner surface to the outer surface.

Embodiment 10: the submersible sensor of Embodiment 1, wherein the first property of the first medium is selected from a group consisting of: a dielectric constant of the first medium and fluid density of the first medium.

Embodiment 11: the submersible sensor of Embodiment 1, wherein the second property of the second medium is selected from a group consisting of: a dielectric constant of the second medium and fluid density of the second medium.

Embodiment 12: a method comprising: detecting capacitance changes at electrodes operatively coupled to an inner surface of a fluid-tight shell; detecting a first property of a first medium responsive to a first detected capacitance changes of the detected capacitive changes; detecting a second property of a second medium responsive to second detected capacitance changes of the detected capacitive changes; and activating one or more operational modes responsive to a difference between the first property and the second property.

Embodiment 13: the method of Embodiment 12, further comprising: detecting a capacitance indicative of a human touch; and in response to the capacitance indicative of the human touch, forgo activating one or more operational modes.

Embodiment 14: the method of Embodiment 12, further comprising: determining the first medium based the first capacitance changes; and determining the second medium based on the second capacitance changes.

Embodiment 15: a microprocessor disposed within a fluid-tight shell and operatively coupled to electrodes operatively coupled to an inner surface of the fluid-tight shell, the microprocessor configured to: detect capacitance changes at the electrodes; detect a first property of a first medium responsive to first detected capacitance changes of the detected capacitive changes; detect a second property of a second medium responsive to second detected capacitance changes of the detected capacitive changes; and activate one or more operational modes responsive to a difference between the first property and the second property.

Embodiment 16: the microprocessor of Embodiment 15, wherein the first property is a fluid density of the first medium and the second property is a fluid density of the second medium.

Embodiment 17: the microprocessor of Embodiment 15, wherein the electrodes includes capacitive electrodes.

Embodiment 18: the microprocessor of Embodiment 15, wherein the one or more operational modes includes a first sensing mode and a second sensing mode different than the first sensing mode.

Embodiment 19: the microprocessor of Embodiment 15, wherein a first operational mode is operable at a first sensing frequency and a second operational mode is operable at a second sensing frequency.

Embodiment 20: the microprocessor of Embodiment 15, wherein the one or more operational modes includes an inactive mode, a stand-by mode, and a sensing mode.

What is claimed is:
1. A submersible sensor comprising:
   a fluid-tight shell comprising:
      an outer surface; and
      an inner surface opposite the outer surface;
   electrodes operatively coupled to the inner surface of the fluid-tight shell; and
   a processor disposed within the fluid-tight shell and operatively coupled to the electrodes, the processor configured to:
      detect capacitance changes at the electrodes;
      detect a first property of a first medium responsive to first detected capacitance changes of the detected capacitive changes detected responsive to submersion of the fluid-tight shell in the first medium;
      detect a second property of a second medium responsive to second detected capacitance changes of the detected capacitive changes detected responsive to submersion of the fluid-tight shell in the second medium; and activate one or more operational modes responsive to a difference between the first property and the second property.

2. The submersible sensor of claim 1, wherein the first property is a fluid density of the first medium and the second property is a fluid density of the second medium.

3. The submersible sensor of claim 1, wherein the electrodes include capacitive electrodes.

4. The submersible sensor of claim 1, wherein the one or more operational modes include a power on mode, a power off mode, a low power mode, and a sensing mode.

5. The submersible sensor of claim 1, wherein the one or more operational modes include a first sensing mode and a second sensing mode different than the first sensing mode.

6. The submersible sensor of claim 1, wherein a first operational mode is operable at a first sensing frequency and a second operational mode is operable at a second sensing frequency.

7. The submersible sensor of claim 1, wherein the processor is selected from a group consisting of: a microcontroller and a microprocessor.

8. The submersible sensor of claim 1, wherein the fluid-tight shell does not include a port extending from the outer surface to the inner surface.

9. The submersible sensor of claim 1, wherein the fluid-tight shell does not include a component physically extending from the inner surface to the outer surface.

10. The submersible sensor of claim 1, wherein the first property of the first medium is selected from a group consisting of: a dielectric constant of the first medium and fluid density of the first medium.

11. The submersible sensor of claim 1, wherein the second property of the second medium is selected from a group consisting of: a dielectric constant of the second medium and fluid density of the second medium.

12. A method comprising:
detecting capacitance changes at electrodes operatively coupled to an inner surface of a fluid-tight shell;
detecting a first property of a first medium responsive to first detected capacitance changes of the detected capacitive changes, the first detected capacitance changes detected responsive to submersion of the fluid-tight shell in the first medium;
detecting a second property of a second medium responsive to second detected capacitance changes of the detected capacitive changes, the second detected capacitance changes detected responsive to submersion of the fluid-tight shell in the second medium; and
activating one or more operational modes responsive to a difference between the first property and the second property.

13. The method of claim 12, further comprising:
detecting a capacitance indicative of a human touch; and
in response to the capacitance indicative of the human touch, forgo activating one or more operational modes.

14. The method of claim 12, further comprising:
determining an identification of the first medium based on the first detected capacitance changes; and
determining an identification of the second medium based on the detected second capacitance changes.

15. A microprocessor disposed within a fluid-tight shell and operatively coupled to electrodes operatively coupled to an inner surface of the fluid-tight shell, the microprocessor configured to:
detect capacitance changes at the electrodes;
detect a first property of a first medium responsive to first detected capacitance changes of the detected capacitive changes detected responsive to submersion of the fluid-tight shell in the first medium;
detect a second property of a second medium responsive to second detected capacitance changes of the detected capacitive changes detected responsive to submersion of the fluid-tight shell in the second medium; and
activate one or more operational modes responsive to a difference between the first property and the second property.

16. The microprocessor of claim 15, wherein the first property is a fluid density of the first medium and the second property is a fluid density of the second medium.

17. The microprocessor of claim 15, wherein the electrodes include capacitive electrodes.

18. The microprocessor of claim 15, wherein the one or more operational modes include a first sensing mode and a second sensing mode different than the first sensing mode.

19. The microprocessor of claim 15, wherein a first operational mode is operable at a first sensing frequency and a second operational mode is operable at a second sensing frequency.

20. The microprocessor of claim 15, wherein the one or more operational modes include an inactive mode, a stand-by mode, and a sensing mode.

* * * * *

UNITED STATES PATENT AND TRADEMARK OFFICE
CERTIFICATE OF CORRECTION

PATENT NO. : 10,908,057 B2  
APPLICATION NO. : 16/224499  
DATED : February 2, 2021  
INVENTOR(S) : Phillip Sebastian Olk Page 1 of 1

It is certified that error appears in the above-identified patent and that said Letters Patent is hereby corrected as shown below:

In the Specification  
Column 2, Line 19, change "art" to --art.--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*